Patented Nov. 4, 1930

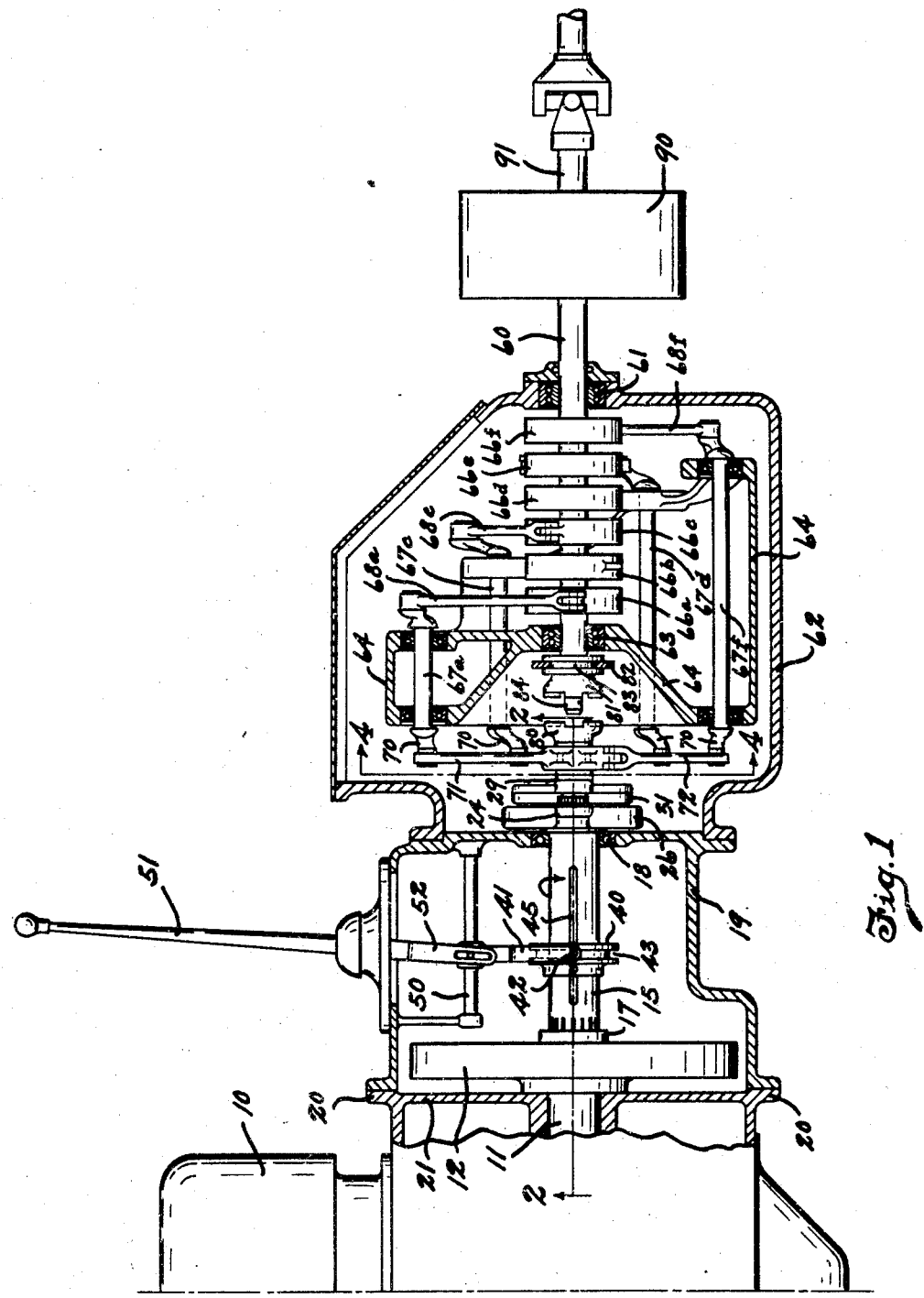

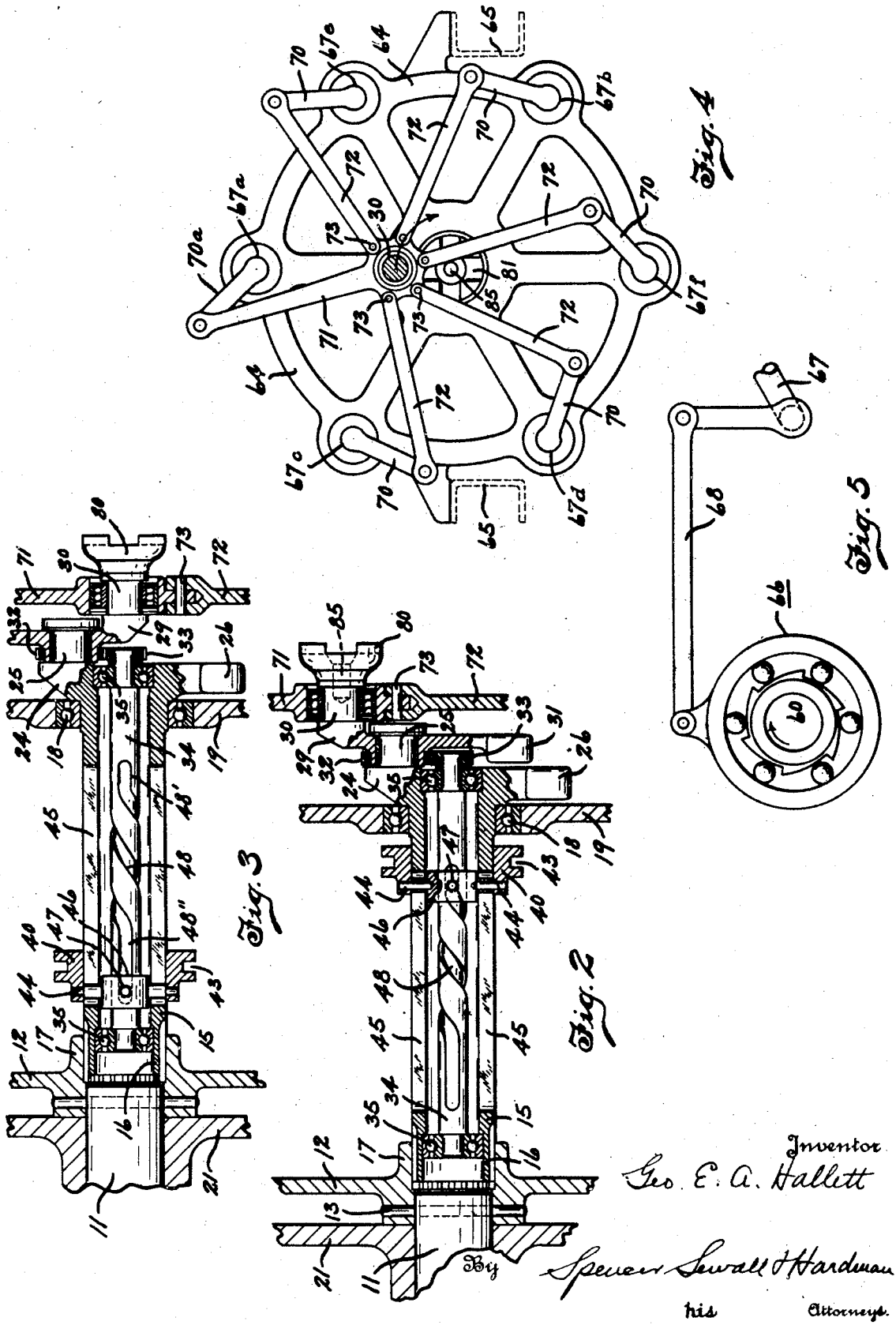

1,780,423

UNITED STATES PATENT OFFICE

GEORGE E. A. HALLETT, OF DAYTON, OHIO, ASSIGNOR TO GENERAL MOTORS RESEARCH CORPORATION, OF DAYTON, OHIO, A CORPORATION OF DELAWARE

VARIABLE-SPEED POWER-TRANSMISSION UNIT

Application filed June 23, 1925. Serial No. 39,073.

This invention relates to a variable speed power transmitting device, such as may be used in transmitting power from the engine to the propeller shaft of motor vehicles.

An object of this invention is to provide a continuously variable speed transmission which will permit the drive and driven shafts to be directly connected during normal driving of the motor vehicle and hence at such times avoid the wear, noise, and intermittent power impulses of the series of oscillating overrunning clutches ordinarily used in such devices.

A further object is to simplify the mechanism for driving the series of oscillating clutches.

A further object is to provide such a transmission wherein the mechanism for driving the oscillating clutches remains stationary when the drive and driven shafts are directly connected and hence the wear on such parts is avoided during normal driving of the motor vehicle. The oscillating clutch mechanism comes into use only when it becomes necessary to reduce the torque ratio between the drive and driven shafts.

Further objects and advantages of the present invention will be apparent from the following description, reference being had to the accompanying drawings, wherein a preferred form of embodiment of the present invention is clearly shown.

In the drawings:

Fig. 1 is a vertical section through an automobile transmission built according to this invention.

Fig. 2 is a sectional view taken on line 2—2 if Fig. 1 on an enlarged scale showing the mechanism for varying the length of the crank throw which drives the oscillating clutches. This figure shows the crank throw set in its maximum throw position.

Fig. 3 is a view similar to Fig. 2 except that it shows the crank throw set at its zero throw position.

Fig. 4 is a section taken on line 4—4 of Fig. 1 and shows the arrangement of the rocker shafts and the manner in which they are driven by the crank throw.

Fig. 5 is a diagrammatic view of one of the oscillating overrunning clutches, and shows the manner in which it is driven by one of the rocker shafts.

Similar reference characters refer to similar parts throughout the several figures of the drawings.

Numeral 10 designates the automobile engine having the crank shaft 11 and the flywheel 12 fixed thereto by pin 13. A hollow shaft 15 is splined at 16 into the hub 17 of the flywheel 12 and is supported at its other end in ball bearing 18 fixed in the stationary housing 19 which is suitably fastened to the flanges 20 on the engine crank case 21. The outer end of hollow shaft 15 has a crank throw 24 provided with a crank pin 25 and a counter balance 26 therefor. This crank pin 25 is therefore rigid with the engine shaft 11 and is constantly driven thereby.

Rotatably mounted upon crank pin 25 is a second crank throw 29 having a crank pin 30 and a counter balance 31 therefor. This crank throw 29 may be rotated upon pin 25 or held stationary thereon by means of the intermeshing gears 32 and 33. Gear 33 is fixed to shaft 34 which is mounted within the hollow shaft 15 upon the ball bearings 35. This internal shaft 34 may be rotated relative to shaft 15 manually by the operator by the following mechanism. A sleeve 40 is shiftable longitudinally along shaft 15 by means of a shifting yoke 41 which has two diametrically opposed lugs 42 which ride in the annular groove 43. This sleeve 40 has two pins 44 which extend through two straight slots 45 in hollow shaft 15 and thus engage and shift the nut 46 along the internal shaft 34. This nut 46 has a projecting lug 47 which engages within the spiral groove 48 in shaft 34. Hence when nut 46 is shifted longitudinally of shaft 15 and held against relative rotation therewith by pins 44 and slots 45 the internal shaft 34 will be rotated relative to shaft 15 an angle according to the distance through which nut 46 is shifted. The pitch of the spiral groove 48 should preferably be so great that the drive between nut 46 and shaft 34 is practically irreversible. The shifting yoke 41 is guided in its shifting movement by the stationary guide rod 50 which is rigidly supported in the housing 19 by any suitable bracket arrangement. Yoke 41 is shifted along guide rod 50 by means of the control lever 51 whose lower forked end 52 has a pin and slot engagement with yoke 41 as clearly shown in Fig. 1. It will now be clear that when control lever 51 is shifted by the operator forwardly or rearwardly the shifting yoke 41 is moved in an opposite direction to cause the rotation of internal shaft 34 relative to the main shaft 15, and hence to cause the relative rotation of crank throw 29 about the crank pin 25. By this means the throw of crank pin 30 relative to the axis of shaft 15 may be varied at will by the operator while the engine is running, that is, while main shaft 15 and the cranks 24 and 29 are all turning as a unit. In Fig. 2 the crank 29 is so turned that the crank pin 30 is positioned at its maximum distance from the axis of drive shaft 15. In Fig. 3 the crank 29 has been turned 180 degrees relative to the crank 24 and since the throw of crank 29 is made exactly equal to the throw of crank 24 the crank pin 30 will be centered upon the axis of drive shaft 15. When in this position it is obvious the rotation of drive shaft 15 merely causes crank pin 30 to rotate upon its own axis. In the drawings, the ratio of gears 33 and 32 is such that two full revolutions of gear 33 will turn gear 32 only 180 degrees. In Fig. 2 the lug 47 lies in a short straight portion 48' of the spiral groove 48 while in Fig. 3 this lug 47 lies in the straight portion 48'' of said spiral groove. These two straight portions 48' and 48'' therefore definitely and exactly locate the crank pin 30 at its maximum throw position and its zero throw position respectively.

The mechanism for driving the driven or propeller shaft 60 by means of the crank pin 30 will now be described. This shaft 60 is axially aligned with the drive shaft 15 upon the ball bearing 61 supported in the stationary transmission housing 62 and the ball bearing 63 supported in the stationary rocker shaft support 64. This support 64 is an irregular shaped casting rigidly mounted within transmission housing 62 upon suitable brackets 65 on the interior walls thereof (see Fig. 4 which shows mounting brackets 65 in dotted lines). A series of oscillating overrunning or one way acting clutches 66ª, 66ᵇ, 66ᶜ, 66ᵈ, 66ᵉ, 66ᶠ are arranged along shaft 60 within housing 62. Each of these clutches 66 is oscillated by a separate rocker shaft 67 which is connected thereto by a connecting link 68. Fig. 5 illustrates the manner in which the oscillating overrunning clutch 66 is driven by the rocker shaft 67. In Fig. 1 the corresponding rocker shaft, connecting link, and overrunning clutch are designated by adding the same reference letter to the reference numerals of the parts.

The rocker shafts 67 are mounted upon suitable ball bearings in the irregular shaped casting 64 being equi-angularly spaced around the axis of shaft 60, as clearly shown in Fig. 4. These rocker shafts 67 of course vary in length so that the right hand end thereof (as viewed in Fig. 1) will fall directly opposite the oscillating clutch driven thereby. The pins of the crank arms 70 on the left ends of rocker shafts 67 are all in the plane of rotation of the crank pin 30. A master connecting rod 71 connects the crank arm 70ª with the crank pin 30. The remaining crank arms 70 are driven by the crank pin 30 through the connecting rods 72 which are all pivoted at the pivot points 73 around the big end of the master connecting rod 71, all as clearly shown in Fig. 4. It will now be obvious that the crank pin 30 in rotating about the axis of shaft 60 will rock the rocker shafts 67 a complete cycle for each revolution thereof, and that at any given instant each rocker is in a different phase of its cycle, three of the rockers being rotated in one direction while the other three are being rotated in the opposite direction. Hence it is clear that the action of the oscillating clutches so overlap each other that a practically smooth, jerkless driving action upon shaft 60 is obtained. Of course if the eccentricity of the crank pin 30 is increased or decreased, as above described, the amplitude of the oscillating clutches is correspondingly increased or decreased. If said eccentricity is reduced to zero, the connecting rods 71 and 72 will remain stationary and hence the rocker shafts 67 and clutches 66 will also remain stationary while the driven shaft 60 will be permitted to turn within the clutches 66 if there is any force other than said clutches 66 causing it to rotate.

Now when crank pin 30 is brought into alignment with the axis of drive shaft 15 it is also in direct alignment with the driven shaft 60. The projecting end of crank pin 30 is provided with a suitable jaw clutch member 80. A corresponding jaw clutch member 81 is splined upon the opposed end of driven shaft 60 so that it may be shifted longitudinally thereof and into engagement with clutch member 80 when crank pin 30 is directly aligned therewith. This shifting of clutch member 81 is accomplished by means of a manually actuated yoke 82 whose shifting fingers ride in the annular groove 83 in member 81 (see Fig. 1). Such shifting yokes are well known in the art and hence it is not deemed necessary to fully illustrate yoke 82 in the drawings. The actuating mechanism for shifting yoke 82 may be similar to that for shifting yoke 41, or it may be of any other suitable and well known design. Clutch member 81 has a tapered central pilot member 84 which projects into a corresponding recess 85 in clutch member 80 when the clutch jaws are in engagement and thus holds said clutch members in exact alignment when the drive and driven shafts are thus directly connected. Thus driving and driven shafts may be connected by a unidirectional coupling for driving the driven shaft at high speed as distinguished from the two directional, one way engaging clutch connection utilized for lower speeds.

In starting an automobile equipped with this transmission, the direct clutch members 80 and 81 are held disengaged, the eccentricity of crank pin 30 reduced to zero by means of the control lever 51, and the engine is then started. The eccentricity of crank pin 30 is now gradually increased by pushing control lever 51 forward as the car gains momentum until the shifting sleeve 40 is in the position shown in Fig. 2, at which time the eccentricity of crank pin 30 is a maximum. The car will now be travelling at a sufficiently high speed to have the propeller shaft directly connected the engine shaft. In order to make this direct connection the eccentricity of crank pin 30 is suddenly reduced to zero, the momentum of the car continuing to drive the shaft 60 at approximately the same speed even though the overrunning clutches 66 are now stationary, the speed of the engine is slowed down somewhat, and then clutch member 81 is shifted by the operator into engagement with member 80 thus directly connecting the engine with the propeller shaft 60.

It will be noted that shaft 60 is always driven in the same direction of rotation. In order to back the car a suitable marine type reverse gear 90 is provided. Such reverse gears are well known in the art and the specific construction thereof forms no part of the present invention and hence will not be described in detail herein. Upon the actuation of this reverse gear 90 the shaft 91 is driven in the opposite direction to that of shaft 60.

While the form of embodiment of the present invention as herein disclosed, constitutes a preferred form, it is to be understood that other forms might be adopted, all coming within the scope of the claim which follows.

What is claimed is as follows:

In variable speed transmissions for motor vehicles the combination of a drive shaft, a driven shaft in alignment with said drive shaft, an over-running clutch adapted to rotate the driven shaft, a journal on the drive shaft, linkage connecting said journal to the over-running clutch, means for adjusting said journal from a position concentric with the drive shaft axis to a position of predetermined maximum eccentricity, a clutch member on the driven shaft, and a co-acting clutch member concentric with said journal and adapted to be engaged with the clutch member on the driven shaft when said journal is concentric with the drive and driven shaft axes.

In testimony whereof I hereto affix my signature.

GEORGE E. A. HALLETT.